Sept. 16, 1952  E. A. WEINBERG ET AL  2,610,821
VALVE

Filed June 18, 1946  2 SHEETS—SHEET 1

INVENTORS
Edwin A. Weinberg
BY George W. White

ATTORNEY

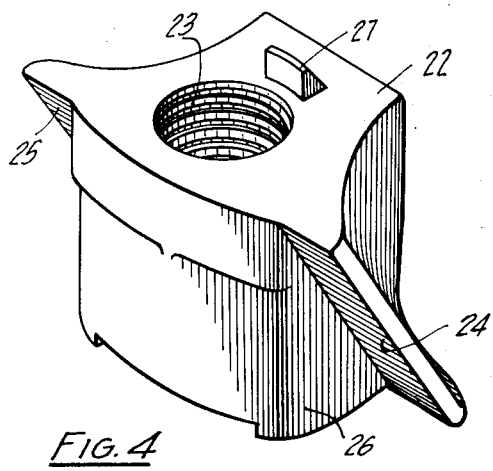
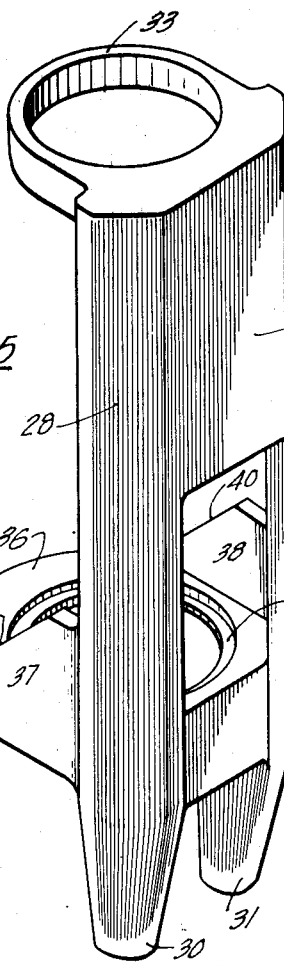
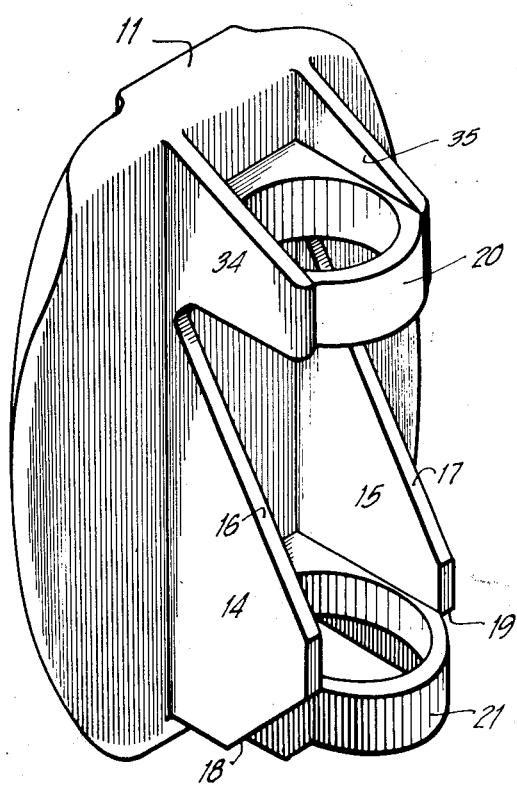
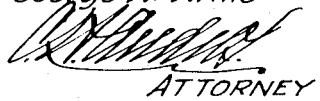

Patented Sept. 16, 1952

2,610,821

UNITED STATES PATENT OFFICE 2,610,821

VALVE

Edwin A. Weinberg, Troy, and George W. White, Schenectady, N. Y.

Application June 18, 1946, Serial No. 677,591

14 Claims. (Cl. 251—57)

Our invention relates to valves and particularly to those of the slide gate type such, for example, as are used in fire hydrants in which the hydrant gate is required to function smoothly and to remain locked in closed position in the event that the upper part of the hydrant is damaged by collision of a vehicle therewith, or otherwise.

In slide gate valves, as distinguished from those of the globe or compression type, the gate is closed by turning a threaded stem which first lowers the gate into approximate alignment with the passage provided for the entrance of water into the body of the valve and thereafter moves the gate laterally into closed position and locks it in this position by means including a wedge. As a result, the force required to operate the gate is only a fraction of the full water pressure against the gate and not the total pressure, as is the case in the other types of valves. Nevertheless, slide gate valves have not operated as easily or as efficiently as is possible.

As heretofore designed, the wedging mechanism which moves the gate laterally into closed position begins to function whenever the downward movement of the gate is stopped. For this reason, any obstruction which stops or retards the downward movement of the gate has a tendency to cause the wedging mechanism to go into operation.

The principal object of our invention is to provide an improved type of wedging mechanism which will utilize to the greatest advantage the comparatively small operating force required to effect a closing and a locking of the gate in closed position. A further object is to provide a valve gate-actuating mechanism in which stoppage of the downward movement of the gate per se due to an obstruction or to any other unforeseen cause will not start the wedging mechanism in operation thereby eliminating the possibility of having the gate wedged and locked in any position other than when it is fully closed.

With these objects in view, our invention includes the novel combinations and arrangements of elements described below and illustrated in the accompanying drawings in which—

Fig. 3 is a perspective view of the rear of the gate;

Fig. 4 is a perspective view of the wedging nut drawn to a substantially larger scale than the gate; and Fig. 5 is a perspective view of the wedging shoe, which is also drawn to a larger scale than the gate.

Referring to the drawings—

Figure 1:
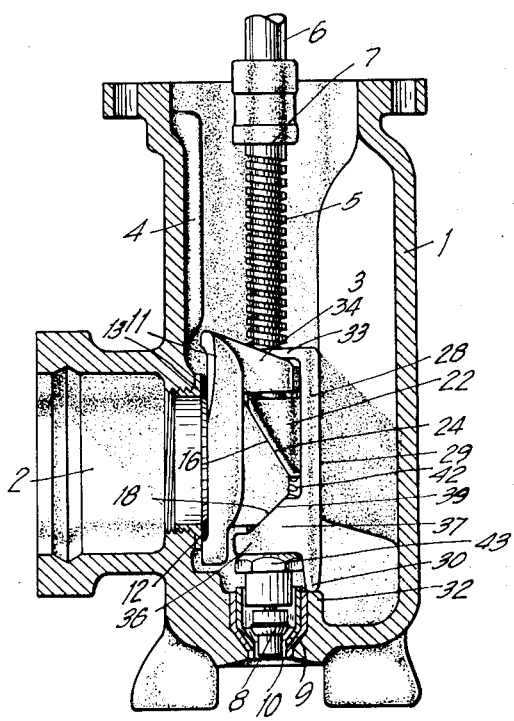
Fig. 1 is a vertical section through the bottom of a hydrant showing the body in section with the stem, gate, wedging mechanism and other parts associated therewith, in side elevation.

1 represents the bottom of the hydrant or a valve body which is provided with a passage 2 for the entrance of water. Within the body and on the side thereof opposite the water entrance, is a vertically extending rib 3 which cooperates with the wedging mechanism described below; and, within the body, and centrally disposed above the water entrance, is a second, vertically-extending rib 4 against which the gate rides as it is lifted. 5 is the threaded stem of the hydrant which is provided with an extension 6 extending to the top of the hydrant, and which is turned to open and close the gate. The stem is also provided with a shoulder 7 at the top of the threaded portion, and with the usual drain valve 8 at the bottom which cooperates with the cup 9 to close the drainage passage 10 in the bottom of the hydrant when the gate is open, but which is automatically raised to open the drain when the gate is closed. 11 is the gate which is provided in the face thereof with a ring 12 of rubber or other suitable material cooperating with the seat 13 to effect a tight closure of the water passage 2. Referring to Fig. 3, which is an enlarged perspective view of the gate, it will be noted that the back thereof is provided with two laterally spaced projections 14 and 15 which are provided on the top with downwardly inclined wedging surfaces 16 and 17, and on the bottom with upwardly inclined wedging surfaces 18 and 19. Near the top and bottom of the gate and on the back thereof are collars 20 and 21 which are adapted to pass the stem 5 and which are illustrated as slightly elliptical with the major axes of the ellipses lying in a plane through the center of the collars perpendicular to the plane of the face of the gate, but which may be otherwise formed, so that the gate is loosely mounted on the stem and may move laterally to some degree with respect to the stem.

22 is the wedging nut which is shown in perspective in Fig. 4. The nut is internally threaded, as shown at 23, to cooperate with the threaded stem and is provided on the sides with downwardly inclinde wedging surfaces 24 and 25 which are adapted to cooperate with the upper wedging surfaces 16 and 17, respectively, on the gate 11. The nut in Fig. 4, as stated above, is drawn to a substantially larger scale than the gate in Fig. 3, and this must be borne in mind, because the body 26 of the nut below the wedging surfaces 24 and 25 fits between the projections 14 and 15 on the back of the gate. On the top, the wedging nut is provided with an upstanding projection 27 upon which the bottom of the collar 20 on the gate rides. Thus, it will be apparent that when the stem is turned so that the nut rises thereon, the nut will lift the gate and, when the stem is turned in the opposite direction so that the wedge nut runs down the stem, the gate will follow by the action of gravity or, be pulled downwardly by the wedge shoe as described below.

Figure 2:
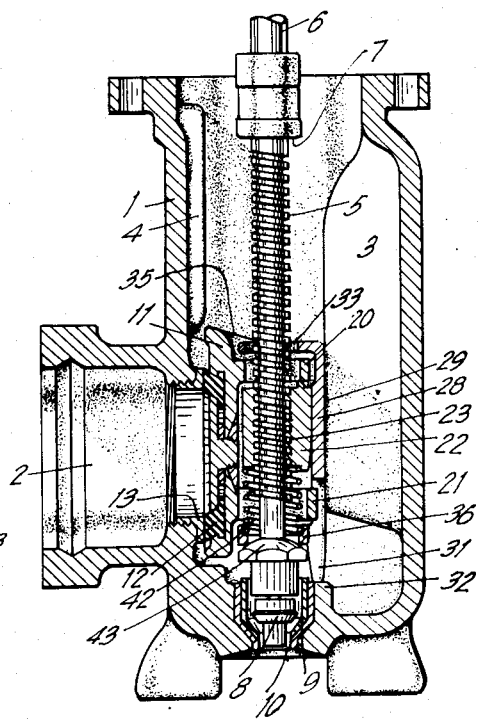
Fig. 2 is a view similar to Fig. 1 in which the gate and the wedging mechanism are shown in section.

28 is the wedge shoe which is best shown in Fig. 5 and which is also drawn to a somewhat larger scale than the gate in Fig. 3. The wedge shoe is provided with a flat back surface 29 which rides against the rib 3, as shown in Figs. 1 and 2. At the bottom, the wedge shoe is provided with a pair of legs 30 and 31 which, when in contact with the top of the raised surface 32 in the bottom of the valve body, as shown in Figs. 1 and 2, limit the downward movement of the shoe. At the top, the shoe is provided with a collar 33 which is adapted to pass between the webs 34 and 35 on the back of the gate near the top (see Fig. 3) and to fit loosely around the stem 5. At the bottom, the shoe 28 is provided with a second collar 36 through which the stem passes freely, and with laterally spaced webs or projections 37 and 38 which are provided on the top with inclined wedging surfaces 39 and 40 adapted, respectively, to cooperate with the wedging surfaces 18 and 19 on the gate, as shown in Fig. 1. An annular recess 41 (see Fig. 5) is provided in the collar 36, and the lower end of a helical compression spring 42 (see Fig. 2) rides in this recess while the top thereof bears against the bottom of the wedge nut 22.

Near its lower end, but above the drain valve, the stem is threaded to receive the bearing nut 43 having a spherical top which is received in the bottom of the collar 36 on the wedge shoe 28 when the valve is closed.

As illustrated in Figs. 1 and 2, the gate is closed and, to open the hydrant, the stem 5 is turned in a counterclockwise direction. As the stem is turned, it advances downwardly through the wedge nut 22, carrying the bearing nut 43 downwardly and away from the bottom of the ring 36 on wedge shoe 28 to unlock the wedges, and this downward movement continues until the drain valve 8 is seated in the bottom of the cup 9, thus closing the drain opening. Bearing in mind that there is the usual swivel connection between the drain valve and the stem 5, the stem 5 may still turn after the drain valve is closed. Therefore, upon a further turning of the stem 5, the wedge nut, which cannot turn, begins to run up on the stem carrying gate 11 which, in turn, carries the wedge shoe 28 with it. The upward movement of the gate may continue until it is stopped by the shoulder 7 on the stem. When the upward movement of the wedge nut 22 begins, the spring 42 expands and forces the wedging surfaces on the wedge nut and the wedging surfaces on the wedge shoe out of cooperative wedging engagement with the gate. When the gate is no longer held shut by the wedges, water pressure on the face thereof forces the gate back against the wedge nut 22 which in turn is forced back against the wedge shoe 28 and the entire assembly moves upward with the flat portion 29 of the wedge shoe riding against the rib 3.

To close the hydrant, the stem is turned in a clockwise direction and the wedge nut 22 begins to move downwardly on the stem 5 carrying the gate and the wedge shoe with it. However, should the wedge shoe offer any resistance to downward movement by gravity, spring 42 will be compressed by the wedge nut, the wedge shoe will be forced downwardly thereby, and, at the same time, the gate 11 will be forced downwardly by the collar 33 on the wedge shoe. Thus, all the parts tend to move downwardly substantially as a unit. The downward movement of the gate and its associated parts continues until the legs 30 and 31 of the wedge shoe contact the raised portion 32 in the bottom of the body. When this occurs, the downward movement of the wedge shoe stops and the wedging surfaces on the wedge nut and the wedging surfaces of the wedge shoe are brought into cooperative wedging relation with the wedging surfaces on the back of the gate so that the gate is forced laterally toward its seat and floated into place along the wedging surfaces 16 and 17, and 18 and 19. When the gate is fully wedged on its seat, the wedge nut, of course, cannot further move down and hence the stem begins to rise, threading its way upwardly through the wedge nut 22 until the bearing nut 43 contacts the bottom of the collar 36 which locks the entire gate assembly in gate-closed position. The upward movement of the stem 5 also unseats the drain valve 8 so that the water remaining in the hydrant will flow out through the drainage opening 10.

From the foregoing, it will be apparent that the mechanical advantages attained in our valve arise from the fact that the gate is provided with upper and lower oppositely inclined wedging surfaces and that the wedging nut 22 in its downward movement is maintained in proper alignment with the stem 5.

In the event that the downward movement of the gate 11 is stopped or retarded before it reaches its lowermost position, the spring 42 will be compressed by the downward movement of the wedge nut which will force the wedge shoe 28 downwardly, carrying the gate along with it by the coaction of the collar 33 therewith, and thus prevent the gate from being locked in a partially open position. All parts tending to lock the gate move downwardly substantially as a unit, and locking can take place only when the legs on the wedge shoe 28 rest upon the raised portion 32 in the bottom of the hydrant.

While we have described our invention as applied to a fire hydrant, it is to be understood that it is applicable to other valves; that the words which we have used are words of description rather than of limitation; and that changes, within the purview of the appended claims, may be made without departing from the true scope and spirit of our invention.

What we claim is:

1. In a valve of the slide gate type comprising a body provided with a passage for the entrance of water thereto, the combination with a gate, having upper and lower collars, for closing said passage, of a stem, loosely embraced by said collars, on which said gate is loosely mounted to provide limited lateral movement thereof with respect to said stem; a wedge nut, having inclined wedging surfaces, on said stem cooperating with said collars on said gate for raising and lowering the same; a two-sided wedge on said gate, having inclined upper wedging surfaces adapted to cooperate with the inclined wedging surfaces on said nut; means, including a wedging shoe carried by said gate; and means for positively stopping the downward movement of said wedging shoe when said gate is in approximate alignment with said passage; said wedging shoe being provided with inclined wedging surfaces adapted to cooperate with lower wedging surfaces on said two-sided wedge for effecting a lateral movement of said gate into passage-closing position when the downward movement of said gate-carried means is positively stopped, and said shoe having upper and lower collars also loosely embracing said stem, the upper collar thereof being adapted to be engaged by the upper collar of said gate, and the lower collar thereof being adapted to be engaged by the lower collar of said gate, whereby said shoe is raised and lowered.

2. A valve of the slide gate type comprising a body having a passage for the entrance of water thereto; a threaded stem; a gate having a front and back for closing said passage provided with upper and lower oppositely-directed angularly disposed wedging surfaces on the back thereof and means loosely embracing said stem to permit lateral movement of said gate; an inwardly-projecting, vertically-extending rib in said body on the side thereof opposite said gate; a nut carried by said stem adapted to abut said embracing means for said gate and provided with wedging surfaces adapted to cooperate with the upper wedging surfaces on said gate; a wedge shoe having portions loosely embracing said stem both above and below said nut and adapted to cooperate with said embracing means on said gate to raise and lower said shoe, a portion adapted to slide up and down in contact with said rib, wedging surfaces adapted to cooperate with the lower wedging surfaces on said gate and means for limiting the downward movement of said shoe when said gate is approximately in alignment with said passage; and resilient means biased normally to force the wedging surfaces on said nut and on said shoe in opposite directions; whereby to release said gate.

3. In a valve comprising a body having a passage for the entrance of water thereto, the combination with a threaded stem, of a gate adapted to close said passage, a wedging shoe, said gate and shoe each having upper and lower cooperating collars loosely embracing said stem to provide limited lateral movement of said gate and shoe with respect to said stem, and said gate being provided on the back thereof with upper, downwardly-inclined and lower, upwardly-inclined wedging surfaces, a nut on said stem disposed between said gate and wedging shoe and restrained from rotation thereby cooperating with said gate and said wedging shoe through said upper collars for raising the same upon rotation of the stem in one direction and provided with wedging surfaces adapted to cooperate with the upper wedging surfaces on said gate, said shoe being provided with wedging surfaces adapted to cooperate with the lower wedging surfaces on said gate, said gate and shoe being movable downwardly by gravity upon rotation of the stem in the opposite direction and means limiting the downward movement of said shoe when said gate is approximately in alignment with said passage; whereby further downward movement of said nut on said stem will force said gate into closing position.

4. In a valve of the slide gate type comprising a body having a passage for the entrance of water thereto, the combination with a threaded stem, of a gate for closing said passage having means loosely embracing said stem to provide limited lateral movement of said gate with respect to said stem, and wedging surfaces having lower and upper portions of opposite inclinations on said gate, a wedge nut on said stem having inclined wedging surfaces cooperating with the upper portions of said wedging surfaces on said gate, a wedge shoe associated with said gate and having means loosely embracing said stem to provide limited relative movement thereof with respect to said gate and cooperating with the embracing means on said gate in a direction axially of said stem, and having inclined wedging surfaces cooperating with the lower portions of said wedging surfaces on said gate, means precluding rotation of said stem, said nut cooperating with the embracing means on said gate to effect movement of said gate and wedge shoe in a direction away from said passage upon rotation of the stem in one direction, said gate and wedge shoe being movable in the opposite direction upon rotation of the stem in the opposite direction, and means limiting the downward movement of said wedge shoe when said gate is in approximate alignment with said passage, all of said wedging surfaces cooperating for effecting a lateral, passage-closing movement of said gate when in substantial alignment with said passage upon continued rotation of said stem in the opposite direction.

5. In a valve of the slide gate type comprising a body provided with a passage for the entrance of water thereto, the combination with a gate for closing said passage having laterally spaced projections on the back thereof, forming downwardly inclined upper and upwardly inclined lower wedging surfaces, upper and lower collars on said gate, a threaded stem on which said gate is loosely embraced by said collars; a wedging nut on said stem cooperating with said gate for raising and lowering the same and provided with wedging surfaces adapted to cooperate with the upper wedging surfaces on said gate, a wedge shoe provided with wedging surfaces adapted to cooperate with the lower wedging surfaces on said gate; said shoe being provided with collars loosely embracing said stem and being supported on said gate; and a spring surrounding said stem and cooperating with said nut and shoe for yieldingly maintaining the wedging surfaces thereof out of cooperative wedging relationship with the wedging surfaces on said gate.

6. A valve of the slide gate type comprising a body having a passage for the entrance of water thereto; a threaded stem; a gate for closing said passage provided with upper and lower angularly disposed wedging surfaces on the back thereof and means loosely embracing said stem; an inwardly-projecting, vertically-extending rib in said body on the side thereof opposite said gate; a nut carried by said stem for raising said gate and provided with wedging surfaces adapted to cooperate with the upper wedging surfaces on said gate; a wedge shoe having portions loosely embracing said stem both above and below said nut, a portion adapted to slide up and down in contact with said rib, wedging surfaces adapted to cooperate with the lower wedging surfaces on said gate and means for limiting the downward movement of said shoe when said gate is approximately in alignment with said passage; resilient means biased normally to force the wedging surfaces on said nut and on said shoe in opposite directions; whereby to release said gate; and means, including limit stops, for locking the wedging surfaces on said nut and said shoe in wedging engagement with the wedging surfaces on said gate when said gate is closed.

7. In a valve of the slide gate type, comprising a passage for the entrance of water thereto, the combination of a gate for closing said passage having upper and lower collars loosely embracing said stem and wedging surfaces having upper and lower portions of opposite inclination, a wedging shoe having upper and lower collars loosely embracing said stem and wedging surfaces coacting with the lower portions of said gate wedging surfaces, a wedge nut on said stem coacting with said wedging shoe to preclude rotation thereof on rotation of said stem and having wedging surfaces coacting with the upper portions of said gate wedging surfaces, means on said nut coacting with one of said upper collars to raise said gate and wedging shoe on rotation of the stem in one direction, the gate and wedging shoe being lowered upon rotation of the stem in the opposite direction, stop means effective to limit the downward movement of the wedge shoe and gate when said gate is in approximate alignment with said passage whereby further rotation of said stem in the opposite direction will effect lateral movement of said gate into sealing engagement with said passage.

8. In a valve of the slide gate type comprising a body having a passage for the entrance of water thereto, the combination with a gate closing said passage having laterally-spaced wedging surfaces with lower and upper portions of opposing inclinations and collars, of a threaded stem loosely embraced by said collars, a wedge nut on said stem, means precluding rotation of said nut, said nut having laterally-spaced wedging surfaces cooperating with said upper portions of the wedging surfaces on said gate, a wedging shoe having laterally-spaced, inclined wedging surfaces separate from said nut and said gate but cooperating with said lower portions for effecting a lateral movement of said gate when said gate is in approximate alignment with said passage for closing said passage, and collars on said shoe loosely embracing said stem and cooperating with the collars on said gate, said nut cooperating with the embracing means on said gate to effect movement of said gate and wedge shoe in a direction away from said passage upon rotation of the stem in one direction, said gate and wedge shoe being movable in the opposite direction upon rotation of the stem in the opposite direction, a spring cooperating with said nut and said wedging shoe biased normally to urge said nut and said wedging shoe out of wedging relationship with said gate, and stop means to limit movement of said wedging shoe in said opposite direction to a position in alignment with said passage, whereby continued rotation of the stem in the opposite direction will force said gate into closing position.

9. In a valve comprising a body having a passage for the entrance of water thereto, the combination with a threaded stem, of a gate adapted to close said passage, means having portions loosely embracing said stem and arranged for axial movement with said gate, said gate having means loosely embracing said stem to provide limited lateral movement of said gate with respect to said stem and provided on the back thereof with an upper, downwardly-inclined and a lower, upwardly-inclined wedging surface, a nut on said stem, means to prevent rotation of said nut, said nut cooperating with said gate for raising the gate and first mentioned means upon rotation of the stem in one direction, said gate and first mentioned means moving downward upon rotation of the stem in the opposite direction, said nut provided with a wedging surface cooperating with the upper wedging surface on said gate, said wedging shoe provided with a wedging surface adapted to cooperate with the lower wedging surface on said gate, means limiting the downward movement of said first mentioned means when said gate is approximately in alignment with said passage upon rotation of the stem in the opposite direction; whereby further downward movement of said nut on said stem upon further rotation of the stem in the opposite direction will force said gate into passage closing position, and means for locking said gate in wedged closed position.

10. In a valve of the slide gate type comprising a body having a passage for the entrance of water thereto, the combination with a gate for closing said passage having upper and lower wedging surfaces, of a threaded stem, means on said gate loosely embracing said stem to permit lateral movement thereof, a wedging shoe having means loosely embracing said stem and arranged for axial movement with said gate, a wedge nut on said stem, means to prevent rotation of said nut, said nut having a wedging surface cooperating with said upper wedging surface, said nut cooperating with said embracing means on the gate to effect raising of the gate and wedging shoe on rotation of the stem in one direction, said gate and stop shoe lowering on rotation of the stem in the opposite direction, stop means for said wedging shoe limiting the lowering of the gate to a position in approximate alignment with said passage, said wedging shoe having a surface thereon cooperating with said lower wedging surface, said wedging surfaces all cooperating on continued rotation of said stem in said opposite direction after the lowering of the gate has been limited to cause said gate to move laterally, and means for locking said gate in wedged, closed position.

11. In a valve of the slide gate type comprising a body having a passage for the entrance of water thereto, the combination with a threaded stem, of a gate for closing said passage having means loosely embracing said stem to provide limited lateral movement of said gate with respect to said stem, and provided with wedging surfaces having lower and upper portions of opposite inclinations, a wedge shoe associated with said gate and having means loosely embracing said stem and arranged to provide limited relative movement thereof with respect to said gate in a direction axially of said stem, a wedge nut on said stem, means preventing rotation of said nut, said nut having wedging surfaces cooperating with the upper portion of the wedging surfaces on said gate, said nut cooperating with the embracing means on the gate for raising the gate and wedge shoe on rotation of the stem in one direction, and for effecting a lateral passage-closing movement of said gate when in substantial alignment with said passage, said wedge shoe being provided with wedging surfaces cooperating with the lower portion of said gate wedging surfaces, said gate and wedge shoe lowering on rotation of the stem in the opposite direction, means limiting the downward movement of said wedge shoe when said gate is in approximate alignment with said passage, said wedging surfaces all cooperating for wedging the gate in closed position on continued rotation of the stem in the opposite direction when movement of the wedge shoe is limited, and means cooperating with said wedge for locking said gate in wedged, closed position.

12. In a valve of the slide gate type comprising a body having a passage for the entrance of water thereto, the combination with a gate having wedging surfaces for closing said passage, of a threaded stem, means on said gate loosely embracing said stem, wedging means, portions on said wedging means loosely embracing said stem to permit lateral movement of said wedging means and to provide limited relative movement thereof with respect to said gate in an axial direction, a wedge nut on said stem, means preventing rotation of said nut, said nut having wedging surfaces cooperating with wedging surfaces on said gate, said wedging means having wedging surfaces cooperating with the wedging surfaces on said gate, a spring cooperating with said nut and said wedging means biased normally to urge said nut and said wedging means out of wedging relationship with said gate, said nut cooperating with the embracing means on rotation of the stem in one direction to elevate the gate and wedging means, said gate and wedging means being lowered on rotation of the stem in the opposite direction, stop means for limiting the lowering of the gate to a position in which the gate is in alignment with the passage whereupon continued rotation of the stem in the opposite direction wedges the gate to close the passage, and means for locking said gate in wedged, closed position.

13. In a valve of the slide gate type comprising a body provided with a passage for the entrance of water thereto, the combination with a gate for closing said passage having laterally spaced projections on the back thereof, forming downwardly inclined upper and upwardly inclined lower wedging surfaces, a threaded stem, means on said gate loosely embracing said stem to permit lateral movement of said gate, a wedge shoe provided with wedging surfaces adapted to cooperate with the lower wedging surfaces on said gate; said shoe being provided with means loosely embracing said stem to permit lateral movement of said shoe and to provide limited movement thereof with respect to the gate in an axial direction, a wedging nut on said stem, means to prevent rotation of said nut, said nut cooperating with the embracing means on the gate to effect raising of the gate and wedge shoe on rotation of the stem in one direction, the gate and wedge shoe being lowered on rotation of the stem in the opposite direction, stop means for said wedge shoe to limit downward movement of the gate to a position approximately opposite the passage, said nut being provided with wedging surfaces adapted to cooperate with the upper wedging surfaces on said gate, the arrangement of the wedging surfaces being such that on continued rotation of the stem in said opposite direction after downward movement of the gate is stopped, the gate is wedged to close the passage, a spring surrounding said stem and cooperating with said nut and shoe for yieldingly maintaining the wedging surfaces thereof out of cooperative wedging relationship with the wedging surfaces on said gate, and means for locking the wedging surfaces on said nut and shoe in wedging engagement with the wedging surfaces on said gate when said gate is in wedged, closed position.

14. In a valve of the slide gate type comprising a body provided with a passage for the entrance of water thereto, the combination with a gate for closing said passage having wedging surfaces with lower and upper portions of opposing inclinations, of a stem, and means on said gate loosely embracing said stem to provide limited lateral movement thereof with respect to said stem, means, including a wedging shoe, associated with said gate and said stem arranged so as to have limited lateral movement with respect to said stem and to provide limited relative movement with respect to said gate in an axial direction, a wedge nut on said stem, means preventing rotation of said nut, said nut having wedging surfaces cooperating with the lower portions of said gate wedging surfaces, said nut cooperating with the embracing means on said gate to effect raising of the gate and said means including said wedge shoe on rotation of the stem in one direction and a lowering of the gate and means including said wedge shoe on rotation of the gate in the opposite direction, means limiting the downward movement of said means including the wedge shoe when the gate is positioned approximately opposite the passage, continued rotation of the stem when downward movement of said gate is stopped effecting wedging closing of said passage by said gate, and means cooperating with said means including said shoe for positively locking said gate in passage closing position.

EDWIN A. WEINBERG.
GEORGE W. WHITE.

REFERENCES CITED

The following references are of record in the file of this patent:

UNITED STATES PATENTS

| Number | Name | Date |
|---|---|---|
| Re. 20,101 | Laurent | Sept. 8, 1936 |
| 300,925 | Ward | June 24, 1884 |
| 618,169 | Duffy | Jan. 24, 1899 |
| 838,509 | O'Brien | Dec. 11, 1906 |
| 1,021,959 | Whitehouse | Apr. 2, 1912 |
| 2,031,372 | Kiesel | Feb. 8, 1936 |
| 2,198,639 | Stines | Apr. 30, 1940 |